United States Patent
Cheng et al.

(10) Patent No.: US 9,177,179 B1
(45) Date of Patent: Nov. 3, 2015

(54) ELECTRONIC SYSTEM WITH CONNECTION ESTABLISHMENT BY BARCODE SCAN

(71) Applicant: Wistron Corporation, New Taipei (TW)

(72) Inventors: Ting-Yao Cheng, New Taipei (TW); Yao-Wei Wang, New Taipei (TW); Ya-Shian Huang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/474,312

(22) Filed: Sep. 2, 2014

(30) Foreign Application Priority Data

Apr. 28, 2014 (TW) .............................. 103115207 A

(51) Int. Cl.
*G06K 7/10* (2006.01)

(52) U.S. Cl.
CPC ....................................... *G06K 7/10* (2013.01)

(58) Field of Classification Search
CPC ..................... G06K 2207/1017; G06K 7/1098
USPC .................................................... 235/462.15
See application file for complete search history.

(56) References Cited

U.S. PATENT DOCUMENTS

| 8,302,848 B2 * | 11/2012 | Koch et al. ...................... 235/375 |
| 2006/0049261 A1 * | 3/2006 | Stadtler ...................... 235/462.15 |
| 2007/0252007 A1 * | 11/2007 | Watanabe ................ 235/462.15 |
| 2012/0194455 A1 | 8/2012 | Hsu |

FOREIGN PATENT DOCUMENTS

TW    M464941    11/2013

OTHER PUBLICATIONS

Asus PadFone mini 4.3, cherryeye, http://www.techbang.com/posts/16067-asus-padfone-mini-43, p. 2, Dec. 11, 2013.
Office action mailed on May 26, 2015 for the Taiwan application No. 103115207, filed Apr. 28, 2014, p. 1 line 12~14, p. 2~4 and p. 5 line 1-10.

* cited by examiner

*Primary Examiner* — Jamara Franklin
(74) *Attorney, Agent, or Firm* — Winston Hsu; Scott Margo

(57) ABSTRACT

The present invention discloses an electronic system including a peripheral device whereon a barcode is formed, and a host device. The peripheral device is detachably installed on the host device. The host device includes a housing, a barcode reading module installed on the housing and for reading the barcode on the peripheral device as the peripheral device is installed on the housing of the host device, and a control module installed inside the housing and electrically connected to the barcode reading module for establishing connection between the host device and the peripheral device according to the barcode read by the barcode reading module.

8 Claims, 5 Drawing Sheets

ELECTRONIC SYSTEM WITH CONNECTION ESTABLISHMENT BY BARCODE SCAN

BACKGROUND OF THE INVENTION

1. Field of the Invention

The present invention relates to an electronic system capable of establishing connection between a host device and a peripheral device, and more specifically, to an electronic system capable of establishing the connection between the host device and the peripheral device by barcode scan.

2. Description of the Prior Art

Nowadays, consumer electronics products, such as tablet computers, smart phones, speakers and earphones, are in widespread use in daily life and progressing. Different electronic devices need to be paired with each other to establish connection therebetween, for example, by performing Bluetooth paring, which conforms to short-distance wireless communication technique. However, it requires a process of operating software to actuate Bluetooth function, searching surrounding devices automatically, choosing a paring object manually, and final confirmation for the pairing, resulting in inconvenience of operation. Therefore, it is an important issue to design a rapid pairing mechanism for different electronic devices so as to enhance efficiency of pairing and connection establishment.

SUMMARY OF THE INVENTION

The present invention relates to an electronic system capable of establishing connection between a host device and a peripheral device by barcode scan, to solve the above mentioned drawbacks.

According to the disclosure, an electronic system includes a peripheral device whereon a barcode is formed, and a host device. The peripheral device is detachably installed on the host device. The host device includes a housing, a barcode reading module installed on the housing and for reading the barcode on the peripheral device as the peripheral device is installed on the housing of the host device, and a control module installed inside the housing and electrically connected to the barcode reading module for establishing connection between the host device and the peripheral device according to the barcode read by the barcode reading module.

According to the disclosure, the host device further includes a memory module electrically connected to the control module and for storing a barcode pairing information, and the control module is for establishing the connection between the host device and the peripheral device as the barcode read by the barcode reading module corresponds to the barcode pairing information.

According to the disclosure, the host device further includes a first data transmission interface electrically connected to the control module, the peripheral device includes a second data transmission interface, and the control module is further for controlling data transmission between the first data transmission interface and the second data transmission interface after establishing the connection between the host device and the peripheral device according to the barcode read by the barcode reading module.

According to the disclosure, the first data transmission interface and the second data transmission interface are Bluetooth transmission interfaces, respectively.

According to the disclosure, the host device further includes a first data transmission interface electrically connected to the control module, and the control module is further for controlling the first data transmission interface to receive data corresponding to the peripheral device from a server after establishing the connection between the host device and the peripheral device according to the barcode read by the barcode reading module.

According to the disclosure, a containing slot is formed on the housing of the host device, the barcode reading module is installed on a side of the containing slot, and the barcode on the peripheral device is located in a position corresponding to the barcode reading module as the peripheral device slides to an installing position inside the containing slot.

According to the disclosure, edges of the peripheral device and the host device are aligned with each other as the peripheral device slides to the installing position inside the containing slot.

According to the disclosure, the peripheral device is a cellphone device, and the host device is a tablet computer device.

The electronic system of the present invention can establish the connection between the host device and the peripheral device by barcode scan. For example, it can utilize the sliding mechanism of the barcode on the peripheral device relative to the barcode reading module of the host device to achieve the pairing, the connection establishment and the structural combination simultaneously. The pairing and the connection establishment can be processed rapidly by barcode scan. It can improve inconvenience of the conventional process of operating software to actuate Bluetooth function, searching surrounding devices automatically, choosing a paring object manually, and final confirmation for the pairing. Therefore, the present invention can enhance efficiency of pairing and connection establishment of different electronic devices.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
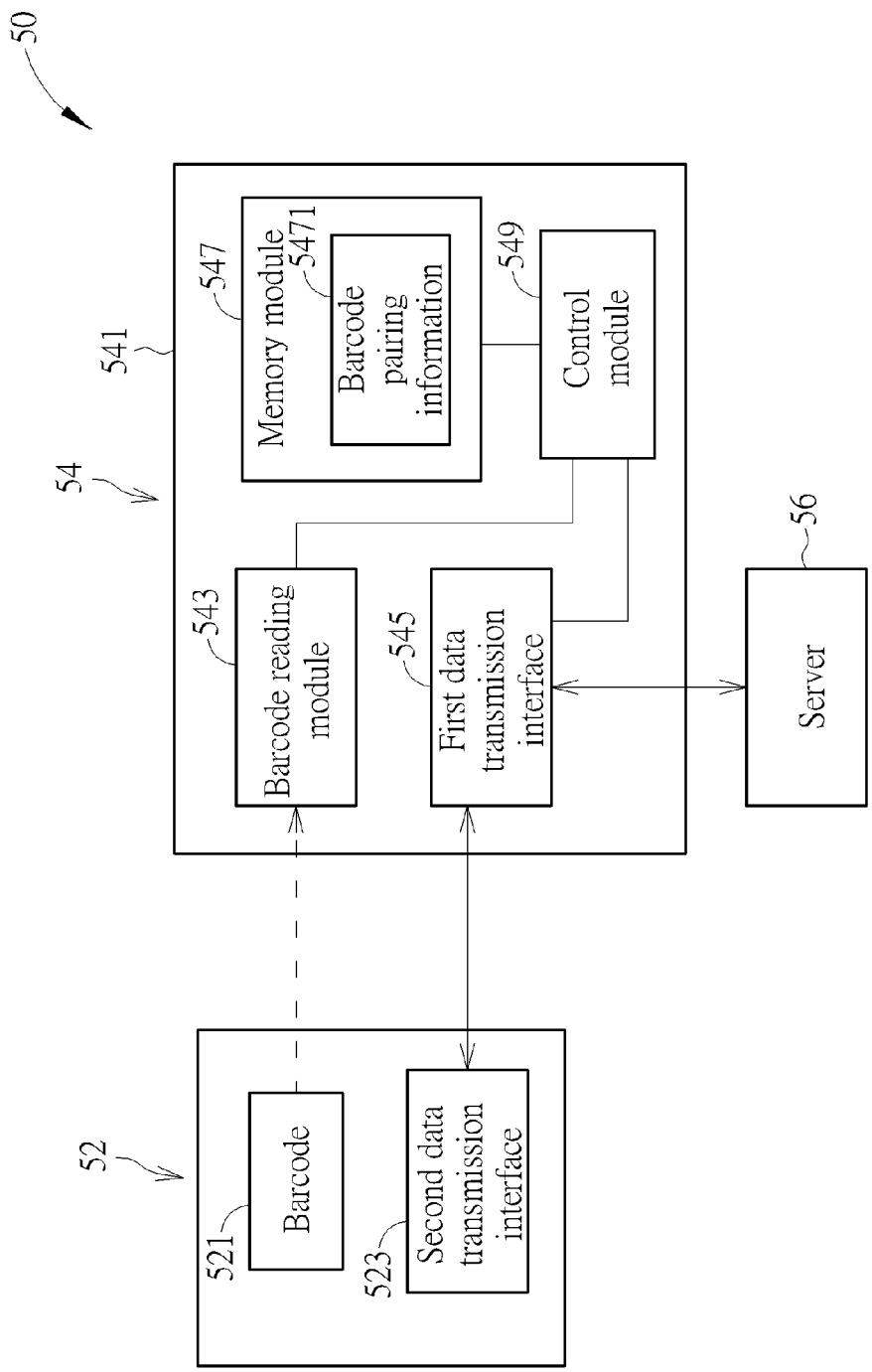
FIG. 1 is a functional block diagram of an electronic system according to an embodiment of the present invention.
Figure 2:
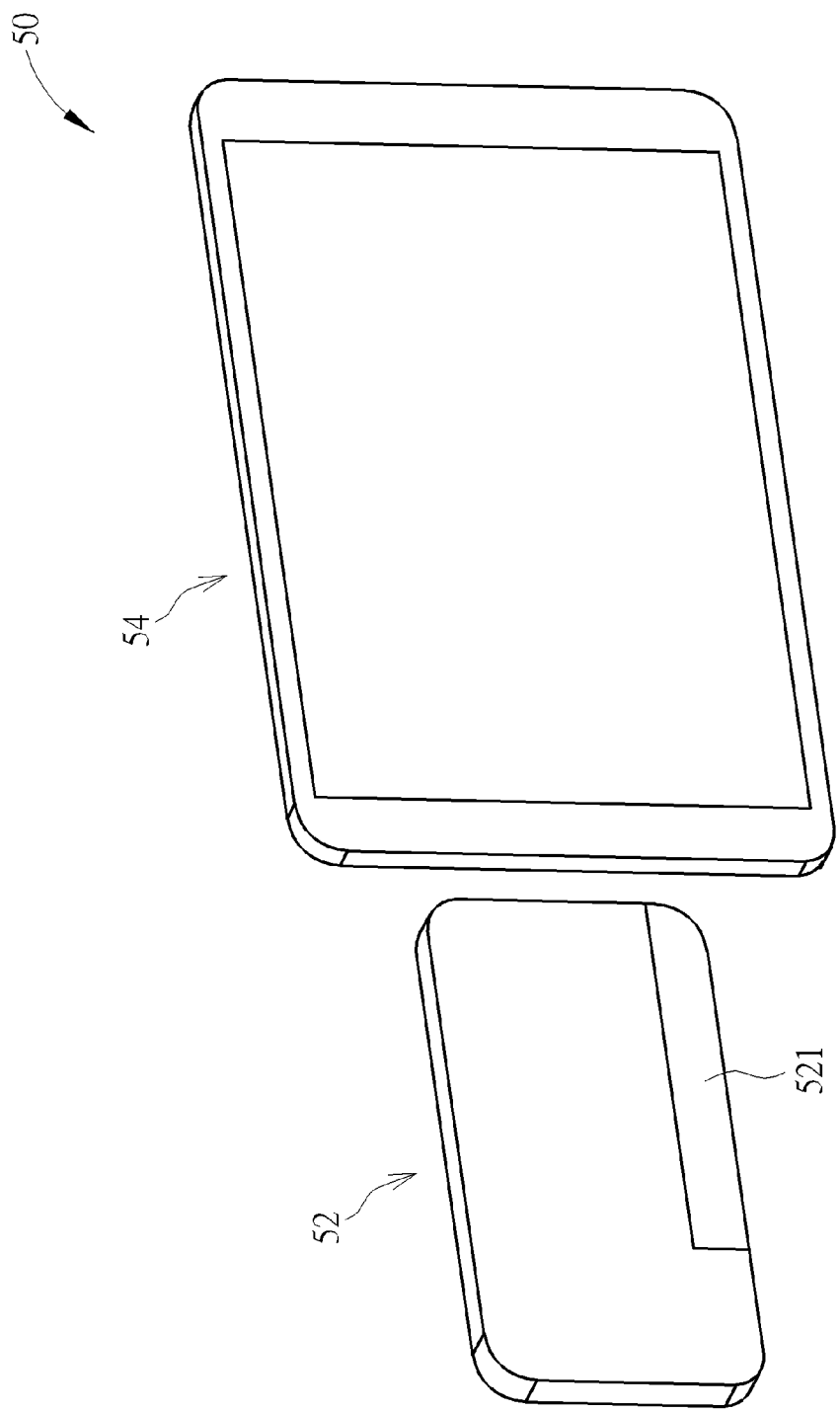
FIG. 2 is a diagram of the electronic system according to the embodiment of the present invention.

Please refer to FIG. 1 and FIG. 2. FIG. 1 is a functional block diagram of an electronic system 50 according to an embodiment of the present invention. FIG. 2 is a diagram of the electronic system 50 according to the embodiment of the present invention. The electronic system 50 includes a peripheral device 52 and a host device 54. The peripheral device 52 can be a cellphone device, and the host device 54 can be a tablet computer device. A barcode 521 is formed the peripheral device 52. The peripheral device 52 includes a second data transmission interface 523. The peripheral device 52 is adapted to be detachably installed on the host device 54. The host device 54 includes a housing 541, a barcode reading module 543, a first data transmission interface 545, a memory module 547 and a control module 549. The barcode reading module 543 is installed on the housing 541 and can be a barcode scanner. The barcode reading module 543 is for reading the barcode 521 on the peripheral device 52 as the peripheral device 52 is installed on the housing 541 of the host device 541. The first data transmission interface 545 and the second data transmission interface 523 can transmit data to each other, such as by wire or wireless transmission technology. For example, the first data transmission interface 545 and the second data transmission interface 523 can be Bluetooth transmission interfaces, respectively. The memory module 547 can store a barcode pairing information 5471.

Besides, the control module 549 is installed inside the housing 541 and electrically connected to the barcode reading module 543, the first data transmission interface 545 and the memory device 547. The control module 549 is for establishing connection between the host device 54 and the peripheral device 52 according to the barcode 521 read by the barcode reading module 543. Specifically, the control module 549 can establish the connection between the host device 54 and the peripheral device 52 as the barcode 521 on the peripheral device 52 read by the barcode reading module 543 corresponds to the barcode pairing information 5471. Furthermore, the control module 549 can further control data transmission between the first data transmission interface 545 and the second data transmission interface 523 after establishing the connection between the host device 54 and the peripheral device 52 according to the barcode 521 read by the barcode reading module 543. After the pairing and the connection establishment of the host device 54 and the peripheral device 52 have been accomplished, data can be transmitted between the host device 54 and the peripheral device 52 by the first data transmission interface 545 and the second data transmission interface 523. For example, the host device 54 can receive image data from the peripheral device 52 to display corresponding images on a screen thereof, or the host device 54 can write setting values onto the peripheral device 52.

According to another embodiment, it can be designed that the control module 549 controls the first data transmission interface 545 to receive data corresponding to the peripheral device 52 from a server 56 after establishing the connection between the host device 54 and the peripheral device 52 according to the barcode 521 read by the barcode reading module 543, instead of data transmission between the first data transmission interface 545 and the second data transmission interface 523, that is, the second data transmission interface 523 can be omitted in this embodiment. After the pairing and the connection establishment of the host device 54 and the peripheral device 52 have been accomplished, the host device 54 can download data corresponding to the peripheral device 52 from the server 56, such as a cloud server, via the first data transmission interface 545. For example, the host device 54 can download setting values of the peripheral device 52, drivers of the peripheral device 52, backup data previously uploaded by the peripheral device 52 and related information corresponding to the peripheral device 52, so as to achieve synchronization between the host device 54 and the peripheral device 52.

Figure 3:
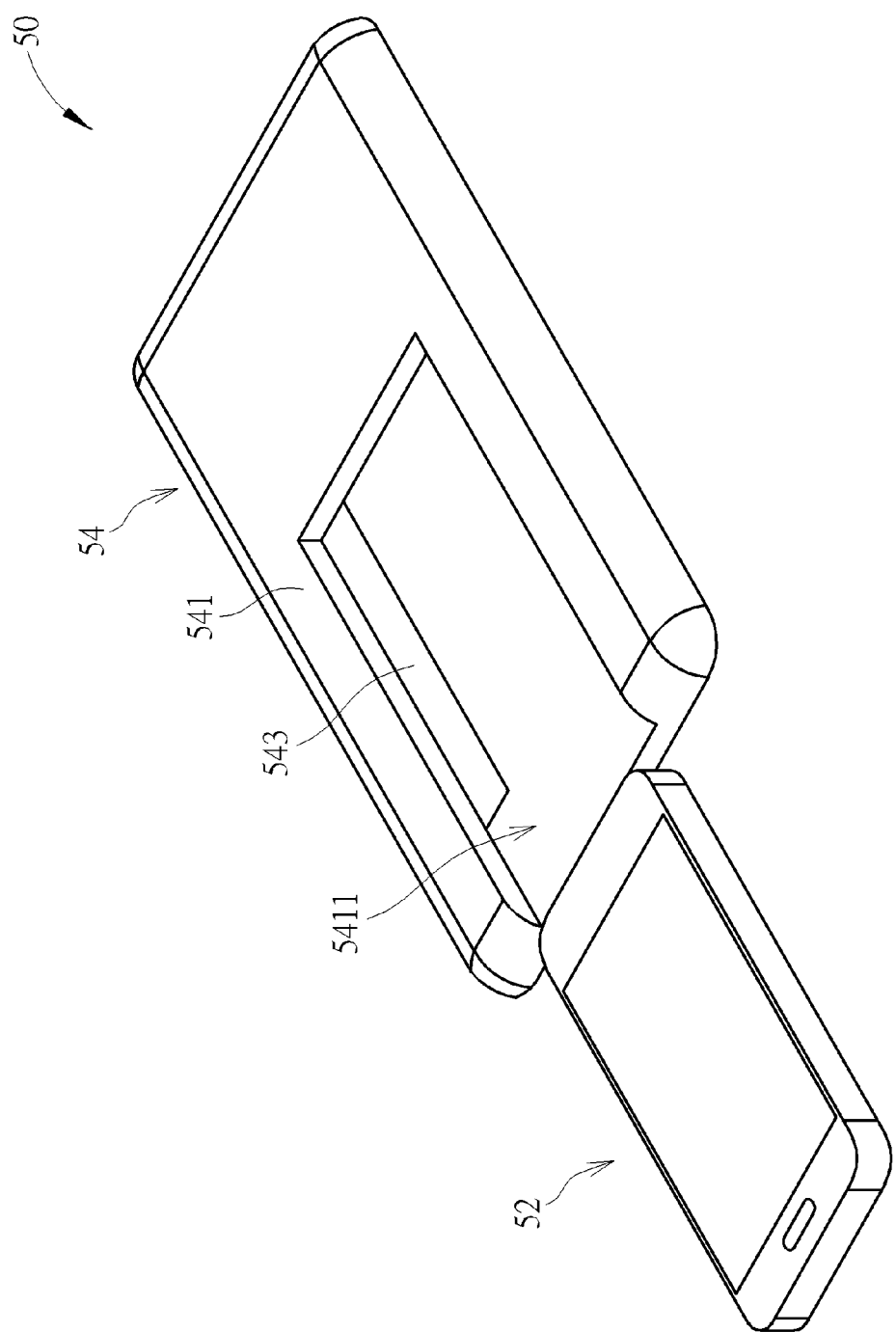
FIG. 3 to FIG. 5 are diagrams of a host device and a peripheral device located in different relative positions according to the embodiment of the present invention.
Figure 4:
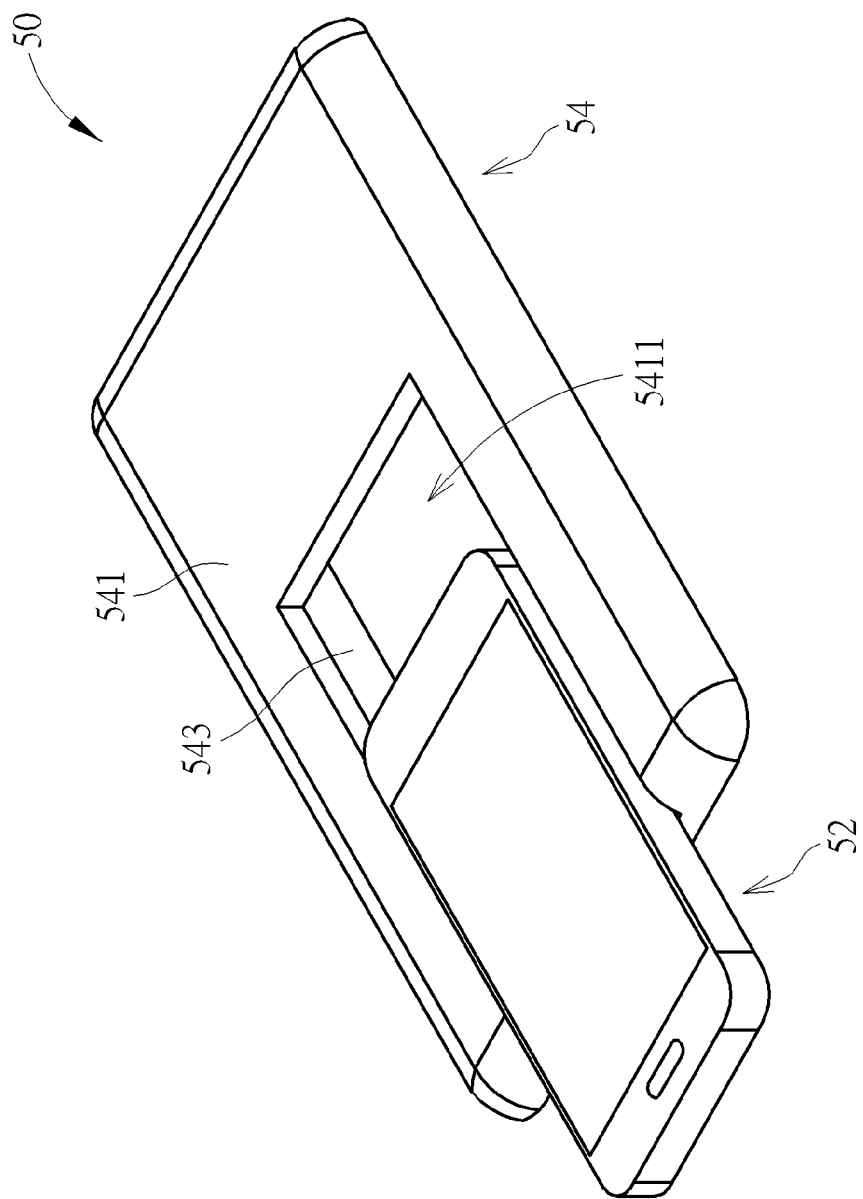
Figure 5:
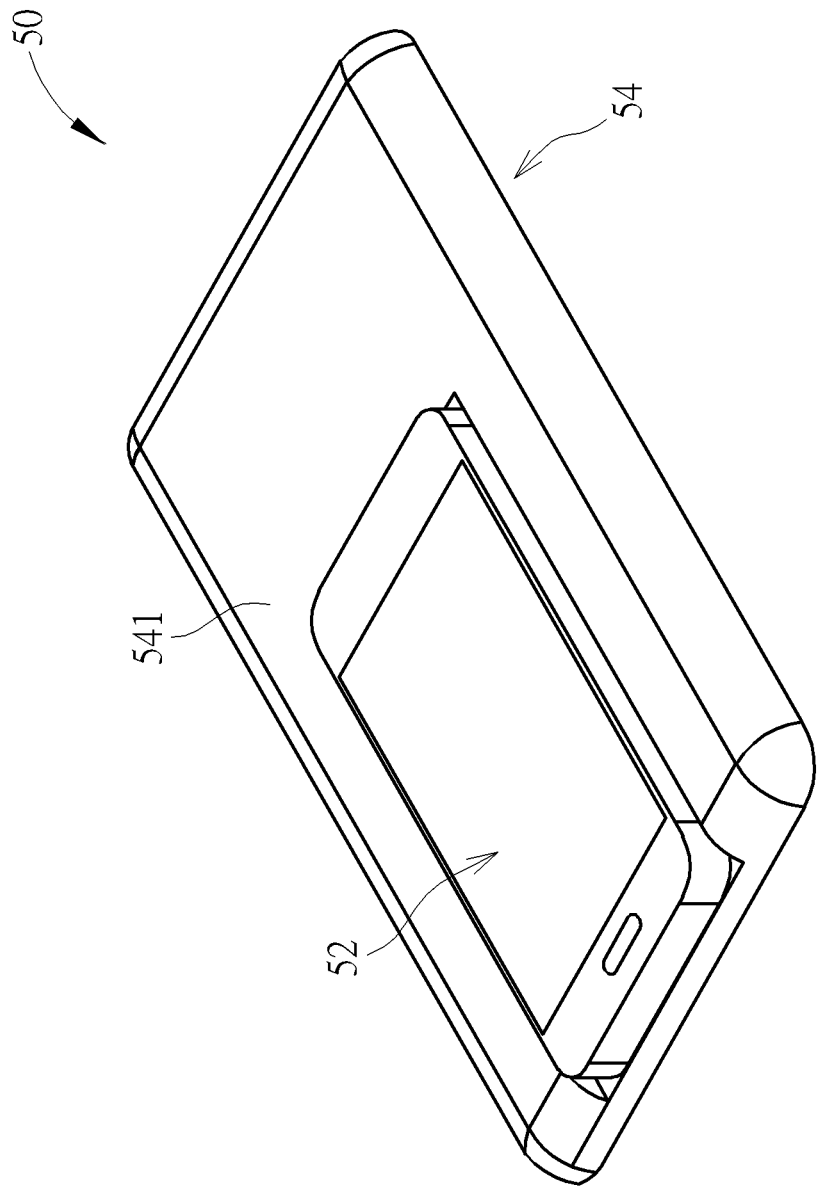

Please refer to FIG. 2 to FIG. 5. FIG. 3 to FIG. 5 are diagrams of the host device 54 and the peripheral device 52 located in different relative positions according to the embodiment of the present invention. As shown in FIG. 3, the peripheral device 52 can be detached from the host device 54 for easy carry. In this situation, the host device 54 and the peripheral device 52 are independent and not paired. For pairing and establishing connection between the host device 54 and the peripheral device 52, the peripheral device 52 is adapted to be installed on the housing 541 of the host device 54. For example, a containing slot 5411 can be formed on the housing 541 of the host device 54, and the barcode reading module 543 is installed on a side of the containing slot 5411. When the peripheral device 52 slides from a position shown in FIG. 4 to an installing position shown in FIG. 5, the barcode 521 on the peripheral device 52 is located in a position corresponding to the barcode reading module 543, so that the barcode reading module 543 can read the barcode 521 on the peripheral device 52 precisely. The host device 54 and the peripheral device 52 can be paired to establish connection automatically by the design of the sliding mechanism of the barcode 521 on the peripheral device 52 relative to the barcode reading module 543 of the host device 54. As for the design of the outward appearance, it can be designed that edges of the peripheral device 52 and the host device 54 are aligned with each other as the peripheral device 52 slides to the installing position inside the containing slot 5411, so as to maintain consistency of the outward appearance of the assembly of the peripheral device 52 and the host device 54. It can utilize the sliding mechanism of the barcode 521 on the peripheral device 52 relative to the barcode reading module 543 of the host device 54 to achieve the pairing, the connection establishment and the structural combination simultaneously. Besides, the peripheral device 52 can be fixed on the host device 54 by any fixing mechanism, such as a magnetic mechanism, and it depends on actual design demand.

In contrast to prior art, the electronic system of the present invention can establish the connection between the host device and the peripheral device by barcode scan. For example, it can utilize the sliding mechanism of the barcode on the peripheral device relative to the barcode reading module of the host device to achieve the pairing, the connection establishment and the structural combination simultaneously. The pairing and the connection establishment can be processed rapidly by barcode scan. It can improve inconvenience of the conventional process of operating software to actuate Bluetooth function, searching surrounding devices automatically, choosing a paring object manually, and final confirmation for the pairing. Therefore, the present invention can enhance efficiency of pairing and connection establishment of different electronic devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system comprising:
   a peripheral device whereon a barcode is formed; and
   a host device, the peripheral device being detachably installed on the host device, the host device comprising:
      a housing;
      a barcode reading module installed on the housing and for reading the barcode on the peripheral device as the peripheral device is installed on the housing of the host device; and
      a control module installed inside the housing and electrically connected to the barcode reading module for establishing connection between the host device and the peripheral device according to the barcode read by the barcode reading module.

2. The electronic system of claim 1, wherein the host device further comprises a memory module electrically connected to the control module and for storing a barcode pairing information, and the control module is for establishing the connection between the host device and the peripheral device as the barcode read by the barcode reading module corresponds to the barcode pairing information.

3. The electronic system of claim 1, wherein the host device further comprises a first data transmission interface electrically connected to the control module, the peripheral device comprises a second data transmission interface, and the control module is further for controlling data transmission between the first data transmission interface and the second data transmission interface after establishing the connection between the host device and the peripheral device according to the barcode read by the barcode reading module.

4. The electronic system of claim 3, wherein the first data transmission interface and the second data transmission interface are Bluetooth transmission interfaces, respectively.

5. The electronic system of claim 1, wherein the host device further comprises a first data transmission interface electrically connected to the control module, and the control module is further for controlling the first data transmission interface to receive data corresponding to the peripheral device from a server after establishing the connection between the host device and the peripheral device according to the barcode read by the barcode reading module.

6. The electronic system of claim 1, wherein a containing slot is formed on the housing of the host device, the barcode reading module is installed on a side of the containing slot, and the barcode on the peripheral device is located in a position corresponding to the barcode reading module as the peripheral device slides to an installing position inside the containing slot.

7. The electronic system of claim 6, wherein edges of the peripheral device and the host device are aligned with each other as the peripheral device slides to the installing position inside the containing slot.

8. The electronic system of claim 1, wherein the peripheral device is a cellphone device, and the host device is a tablet computer device.

* * * * *